United States Patent
Bin Ahmad et al.

(10) Patent No.: US 11,429,161 B2
(45) Date of Patent: Aug. 30, 2022

(54) HARD DISK DRIVE CARRIER INSTALLATION SYSTEM

(71) Applicant: Dell Products L.P., Round Rock, TX (US)

(72) Inventors: Mohd Noor Affendy Bin Ahmad, Pulau Pinang (MY); Yilong Wu, Xiamen (CN); Muizzuddin B. Mohd Fauzi, Pulau Pinang (MY); Hamidi Bin Daud, Pulau Pinang (MY); Mohamad Haziq Bin Zahbah, Pulau Pinang (MY); Eric Soon Heng Chong, Penang (MY)

(73) Assignee: Dell Products L.P., Round Rock, TX (US)

( * ) Notice: Subject to any disclaimer, the term of this patent is extended or adjusted under 35 U.S.C. 154(b) by 297 days.

(21) Appl. No.: 16/889,985

(22) Filed: Jun. 2, 2020

(65) Prior Publication Data

US 2021/0373620 A1    Dec. 2, 2021

(51) Int. Cl.
*G06F 1/18*        (2006.01)
*G06T 7/00*        (2017.01)

(52) U.S. Cl.
CPC .............. *G06F 1/187* (2013.01); *G06T 7/001* (2013.01); *G06T 2207/30164* (2013.01)

(58) Field of Classification Search
CPC ... G11B 33/128; G06F 1/187; G06F 21/6245; G06F 9/44526; G06T 2207/30164; G06T 7/001; H04L 63/0414; H04L 51/04
USPC .......................................... 382/141; 324/538
See application file for complete search history.

(56) References Cited

U.S. PATENT DOCUMENTS

| | | | | |
|---|---|---|---|---|
| 2016/0077145 A1* | 3/2016 | Lau | ......................... | G11B 33/02 324/538 |
| 2020/0356147 A1* | 11/2020 | Pham | ...................... | G06F 1/181 |

* cited by examiner

*Primary Examiner* — Phuoc H Doan
(74) *Attorney, Agent, or Firm* — Terrile, Cannatti & Chambers, LLP; Emmanuel A. Rivera

(57) ABSTRACT

A system, method, and computer-readable medium are disclosed for assembling a hard disk drive (HDD) carrier. An information handling system provides instructions to position the HDD carrier in place in order to secure multiple HDD units. An image is captured of secure holes on the HDD carrier in which fasteners are to be installed. The information handling system provides instructions to fetch the fasteners used to secure the HDD units to the HDD carrier and instructions to install the fasteners to the HDD carrier. An image is captured of installed fasteners on the HDD carrier. Verification is performed of installation of the installed fasteners by comparing the installed fasteners to location data in an application of the information handling system.

20 Claims, 8 Drawing Sheets

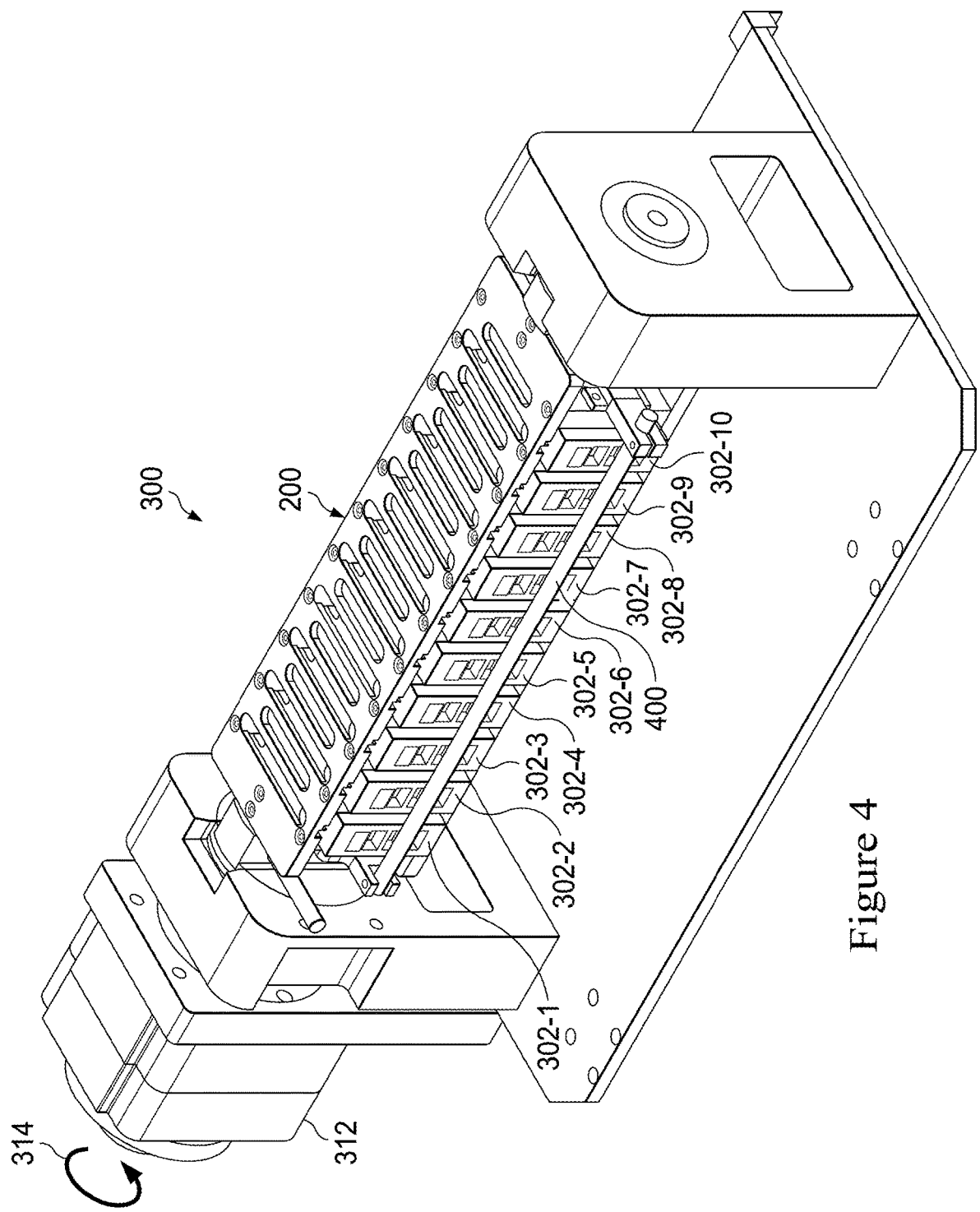

HARD DISK DRIVE CARRIER INSTALLATION SYSTEM

BACKGROUND OF THE INVENTION

Field of the Invention

The present invention relates to manufacturing of computer systems. More specifically, embodiments of the invention relate to the manufacturing of hard disk drive carriers of computer systems.

Description of the Related Art

In a computing system, such as a server computer system, multiple hard disk drive (HDD) units integrated into a single assembly can be implemented as part of the computer system. In manufacturing facilities, there can be several different computing systems that are assembled. Different computing systems can use different types of HDDs. For example, one type of computer system can implement 2.5 inch HDD units, while another type of computer system can implement 3.5 inch HDD units.

In a typical manufacturing and assembly process, the HDD units are manually placed into a common carrier and manually secured in place on the carrier by a technician. Correct placement of securing screws and torque is important to assure proper assembly. A visual inspection may be performed by the technician to assure that the HDD units are properly aligned in the carrier. The completed HDD units in the carrier are integrated into the computer system.

The manual process can be tedious and take up significant time. As build cycles for computer systems increase, the need to quickly and correctly assembly HDD units also increases. With manual assembly, there can be in consistencies which can lead to low quality in the assembling HDD units. Missing or misaligned securing screws can lead to low first pass yields (FPY) of assembled HDD units in carriers.

SUMMARY OF THE INVENTION

A system, method, and computer-readable medium are disclosed for assembling a hard disk drive (HDD) carrier, comprising providing instructions to position the HDD carrier in place in order to secure multiple HDD units; capturing an image of secure holes on the HDD carrier in which fasteners are to be installed; providing instructions to fetch the fasteners used to secure the HDD units to the HDD carrier; providing instructions to install the fasteners to the HDD carrier; capturing an image of installed fasteners on the HDD carrier; and verifying by installation of the installed fasteners by comparing the installed fasteners to location data in an application.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein:

FIG. 4 depicts a flip assembly with a hard disk drive (HDD) carrier that includes multiple HDD units;

DETAILED DESCRIPTION

A system, method, and computer readable medium are disclosed to assemble hard disk drive (HDD) carriers. The HDD carrier includes multiple HDD units, which can be of varying types or sizes. Using a vision camera solution, quality of installation is verified.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
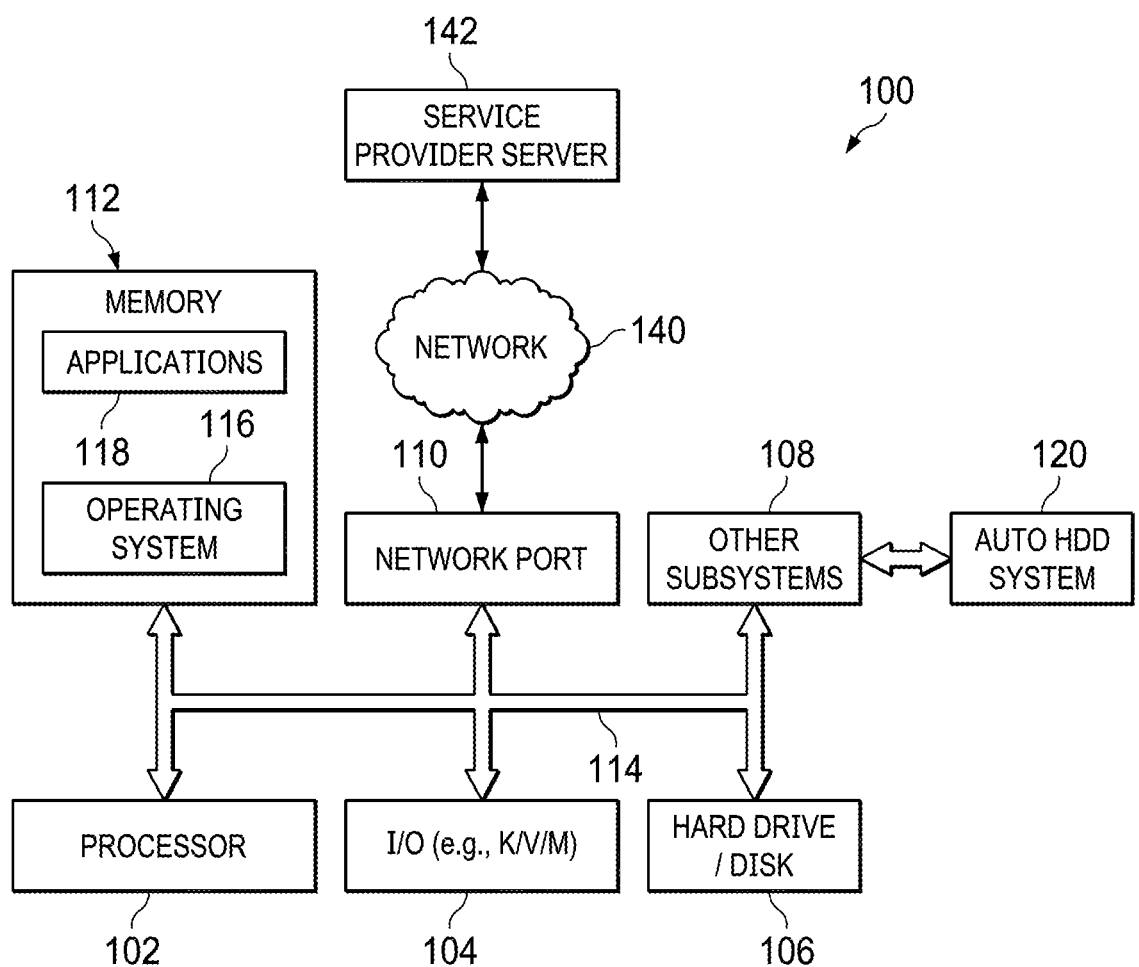
FIG. 1 depicts a general illustration of a computing system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes an operating system (OS) 116 and applications 118. In certain embodiments, applications 118 are provided as a service from the service provider server 142.

Certain embodiments provide for other systems 108 to include or connect to an automatic hard disk drive (HDD) carrier installation system or auto HDD system 120. Certain implementations provide for the auto HDD system to be controlled by an application or programmable logic control (PLC) of applications 118 and allows a user/operator to control the auto HDD system 120 through I/O devices 104.

The information handling system 100 including the auto HDD system 120 can be considered as a machine control system that advises the user of status of installation and pass or fail conditions of HDD carriers. The memory 112 and applications 118 can include data or information as to alignment of fasteners (e.g., screws) on an HDD carrier as described herein. The data or information is used in quality control and verification of installation of fasteners or screws as described herein.

Figure 2:
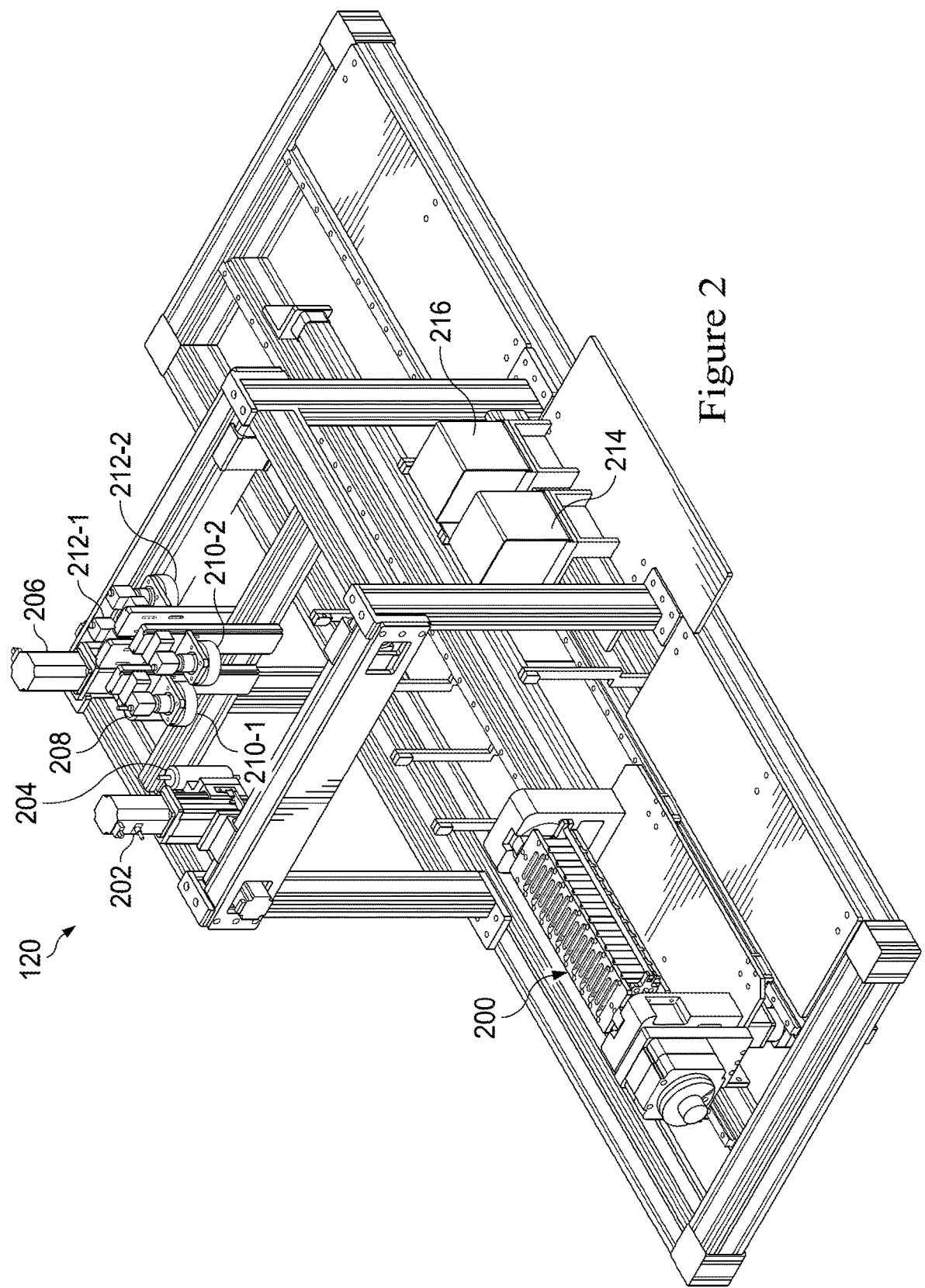
FIG. 2 depicts auto hard disk drive (HDD) carrier system.

FIG. 2 shows a plan view of an example auto HDD carrier system 120. The auto HDD carrier system 120 includes an HDD jig assembly or carrier 200. The HDD carrier 120 is configured to hold or include multiple HDD units to be installed as part of a computer system, such as a server system. As further described herein, the HDD carrier 200 can support different size HDD units, such as 2.5 inch and 3.5 inch HDD units.

Certain implementations provide for the auto HDD carrier system 120 includes dual axis Y-Z robotic tools that fasten screws to HDD units on carrier 200. In certain embodiments a Y-Z robotic tool is provided for a particular size HDD unit. A 2.5 inch HDD dual axis Y-Z robot 202 is implemented with a 2.5 inch HDD screw pick up tool 204. A 3.5 inch HDD dual axis Y-Z robot 206 is implemented with a 3.5 inch HDD screw pick up tool 208.

Various embodiments provide for the auto HDD carrier system 120 to include 2.5 inch HDD vision cameras 210-1 and 210-2 to support 2.5 inch HDD units. Furthermore, the auto HDD carrier system 120 can include 3.5 inch HDD vision cameras 212-1 and 212-2 to support 3.5 inch HDD units. As described herein, the vision cameras 210 and 212 provide a vision camera solution to assure quality of installation.

The auto HDD carrier system 120 includes vibrator bowls or containers of specific screws. In this example, to support 2.5 inch HDD units, a 2.5 inch HDD screw vibrator bowl 214 is provided. To support 3.5 inch HDD units, a 3.5 inch HDD screw vibrator bowl 216 is provided. The 2.5 inch HDD screw pick up tool 204 is configured to retrieve screws from the 2.5 inch HDD screw vibrator bowl 214. The 3.5 inch HDD screw pick up tool 208 is configured to retrieve screws from the 3.5 inch HDD screw vibrator bowl 216.

Figures 3A, 3B:
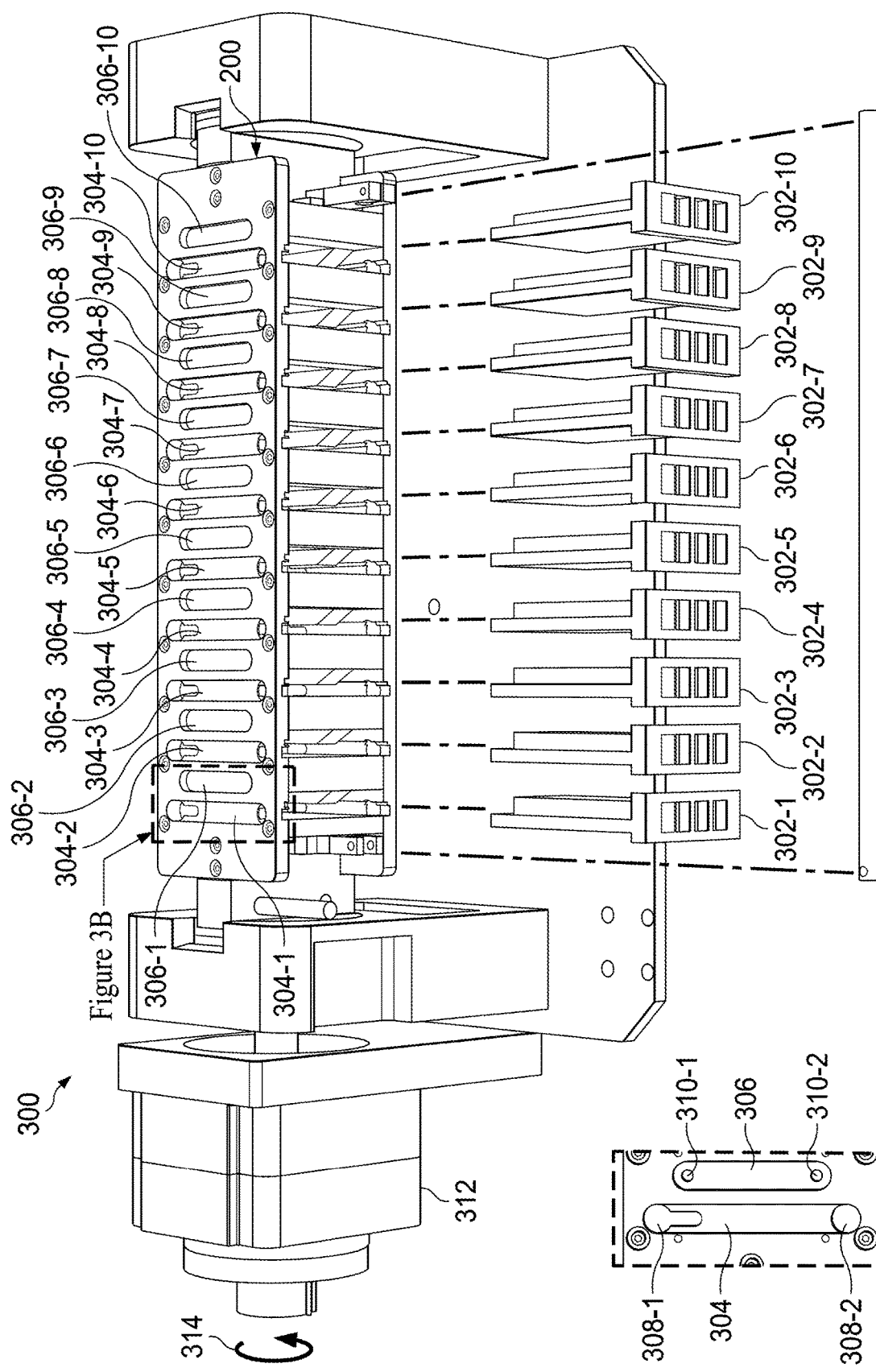
FIG. 3A depicts a flip assembly with a hard disk drive (HDD) carrier that includes multiple HDD units.
FIG. 3B depicts securing points of a hard disk drive (HDD) carrier.

FIG. 3A shows a view of an example flip assembly with an HDD carrier that includes multiple HDD units. The flip assembly 300 is part of the auto HDD system 120 and is configured to hold an HDD carrier 200. HDD carrier 200 is configured to include multiple HDD units 302. In this example, ten HDD units 302-1 to 302-10 are installed in HDD carrier 200. As described, HDD units 302 can include different types and sizes of HDD units. The example describe herein, are 2.5 inch HDD units and 3.5 inch HDD units; however, it is to be understood that other types and sizes of storage units can be implemented.

For certain implementations, for each type or size of HDD unit different securing or screw points can be implemented on HDD carrier 200. For example, securing points 304 can be provided for 3.5 inch HDD units, and securing points 306 can be provided for smaller 2.5 inch HDD units.

Now referring to FIG. 3B, an expanded view of securing points is shown. In certain implementations, a securing point 304 includes to screw or attachment points 308-1 and 308-2. A securing point 306 includes screw or attachment points 310-1 and 310-2. It is to be understood that other embodiments and implementations, can make use of other attachment points. The auto HDD carrier system 120 is configured to assure that fastening or attachment to securing points is properly performed.

Referring back to FIG. 3A, the flip assembly 300 in various embodiments includes a motor 312 that rotates the HDD carrier 200 in direction 314. Rotating is performed to position the HDD carrier 200 in place in reference to the dual axis Y-Z robotic tools 202 and 206, and HDD vison cameras 210 and 212. Once rotated and in place, securing and fastening of HDDs units to the flip assembly 300 can be performed.

FIG. 4 shows another view of example flip assembly 300. In this plan view, HDD units 302-1 to 302-10 are installed in HDD carrier 200. In certain embodiments, the HDD carrier 200 includes a locking bar 400 to secure the HDD units 302.

Figure 5:
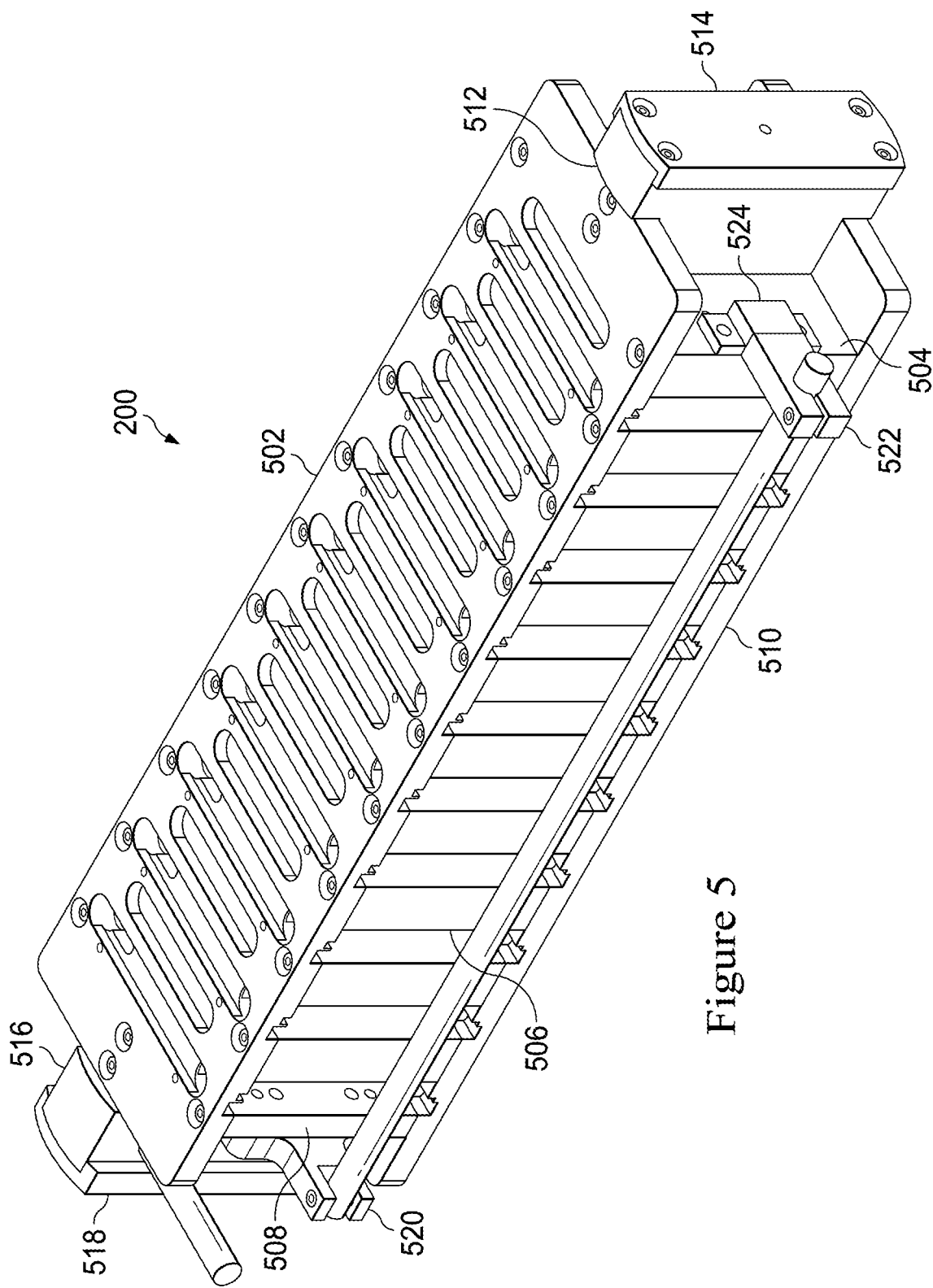
FIG. 5 depicts a hard disk drive (HDD) carrier.

FIG. 5 shows a view of an example HDD carrier 200. The view illustrates the HDD carrier without the HDD units 302. In certain implementations, the HDD carrier 200 includes a rack 502, a fixed block top 504, a fixed block 506, another fixed block 508, another rack 510, a floating flip mount 512, a floating fixed mount for HDD units 514, a fixed flip mount 516, a fixed mount for fixed HDD units 518, a fixed HDD unit lock 520, a magnetic lock for HDD units 522, and a magnet 524.

Figure 6:
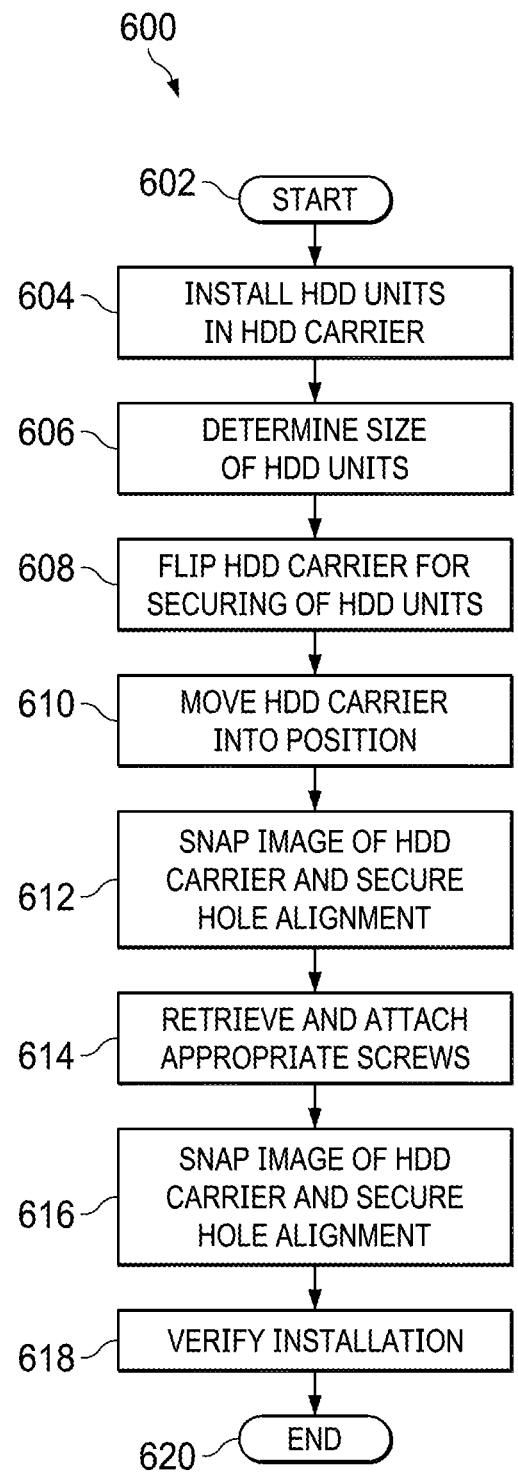
FIG. 6 shows a flow chart for assembling a hard disk drive (HDD) carrier.

FIG. 6 is a generalized flowchart 600 for assembling a hard disk drive carrier. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, hard disk drive (HDD) units 302 are installed in HDD carrier 200. The installation can be performed manually or by a loaded by a machine. The HDD units 302 can be secured by a locking bar 400 in HDD carrier 200; however, complete securing is not complete, until the fasteners or screws are installed.

At step 606, a determination is made as to the type and size of the HDD units 302. The HDD carrier 200 can support different size HDD units 302, such as 2.5 inch and 3.5 inch HDD units. In certain implementations, a user/operator enters the type and size of the HDD units through a user interface as described herein. When the auto HDD carrier system 120 recognizes the type and size of HDD units, the appropriate data or information can be retrieved from memory 112 and applications 118 to support installation and verification of fasteners or screws on HDD carrier 200.

At step 608, the HDD carrier 200 is flipped by the flip assembly 300 to the correct axis position to secure fasteners or screws. Instructions are provided to perform the flipping based on the data or information regarding installation and fastening. The motor 312 turns the HDD carrier 200 in direction 314 as described herein.

At step 610, the HDD carrier 200 is moved into position. Instructions are provided to the flip assembly 300 to move into position with the HDD carrier 200 and HDD units 302.

At step 612, an image is taken (snapped) by HDD vision cameras 210 and 212 as to the position of the HDD carrier 200 and HDD units 302. The images are used with memory 112 and applications 118 to support installation and verification of fasteners or screws on HDD carrier 200. The images can be displayed on a user interface as described herein.

At step 614, appropriate fasteners or screws are retrieved and attached. Instructions are provided to the dual axis Y-Z robotic tools 202 and 206 to retrieve the fasteners or screws from vibrator bowls 214 and 216. The dual axis Y-Z robotic tools 202 and 206 are configured to perform the attaching. The dual axis Y-Z robotic tools 202 and 206 are configured to apply the proper torque force to install the screws.

At step 616, another image is taken (snapped) by HDD vision cameras 210 and 212 as to the position of the HDD carrier 200 and HDD units 302. The images are used with memory 112 and applications 118 to support installation and verification of fasteners or screws on HDD carrier 200. The images can be displayed on a user interface as described herein.

At step 618, verification of the installation is performed. Verification can be performed by referencing data and information in memory 112 and applications 118 as to proper location and installation. At step 620, the process 600 ends.

Figure 7:
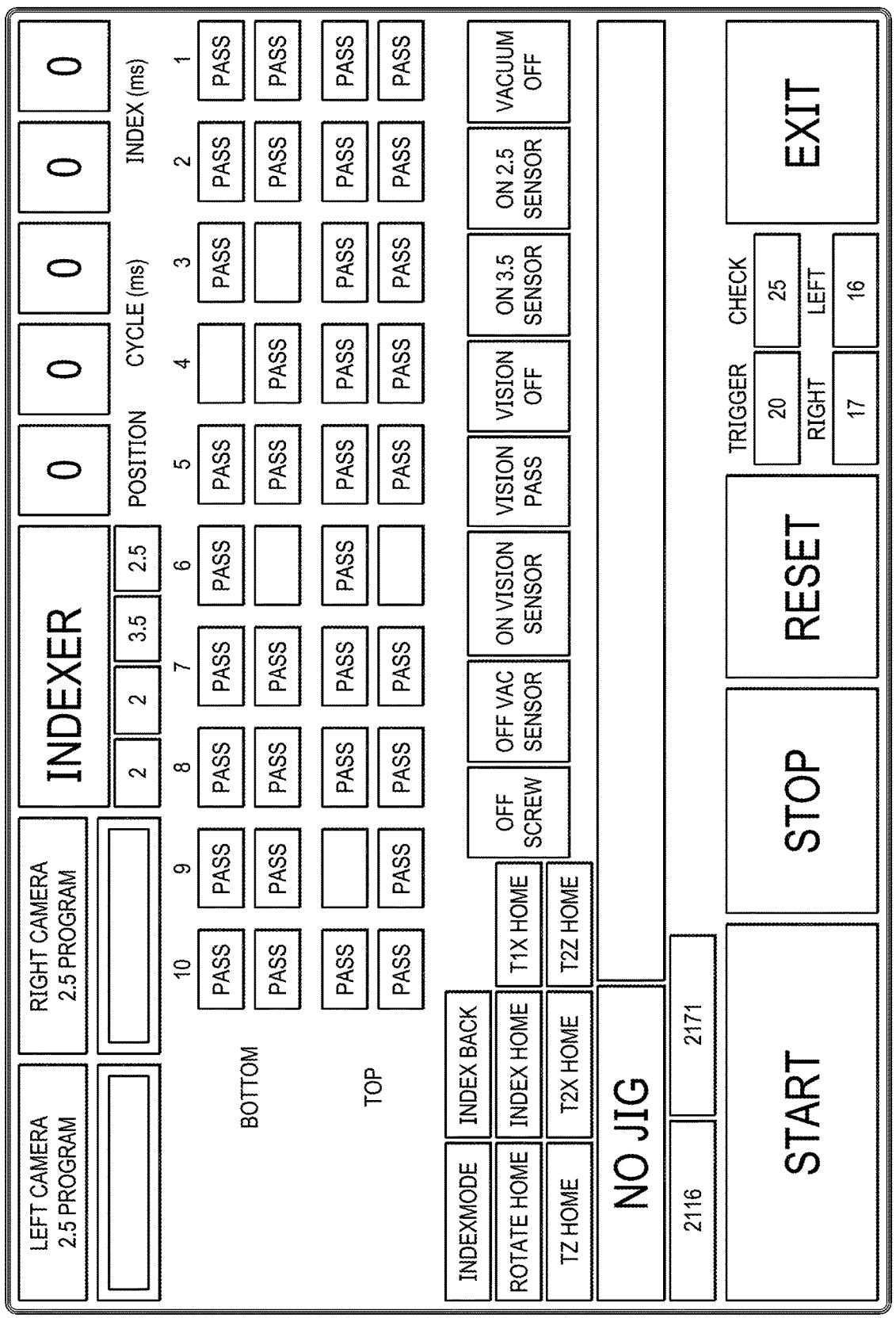
FIG. 7 shows a user interface that manages an auto hard disk drive (HDD) system.

FIG. 7 shows a user interface to manage auto HDD carrier system 120. In certain implementations, the user interface can be presented as part of a settings program or on screen display (OSD) control software in applications 118 as part of information handling system 100.

Figure 8:
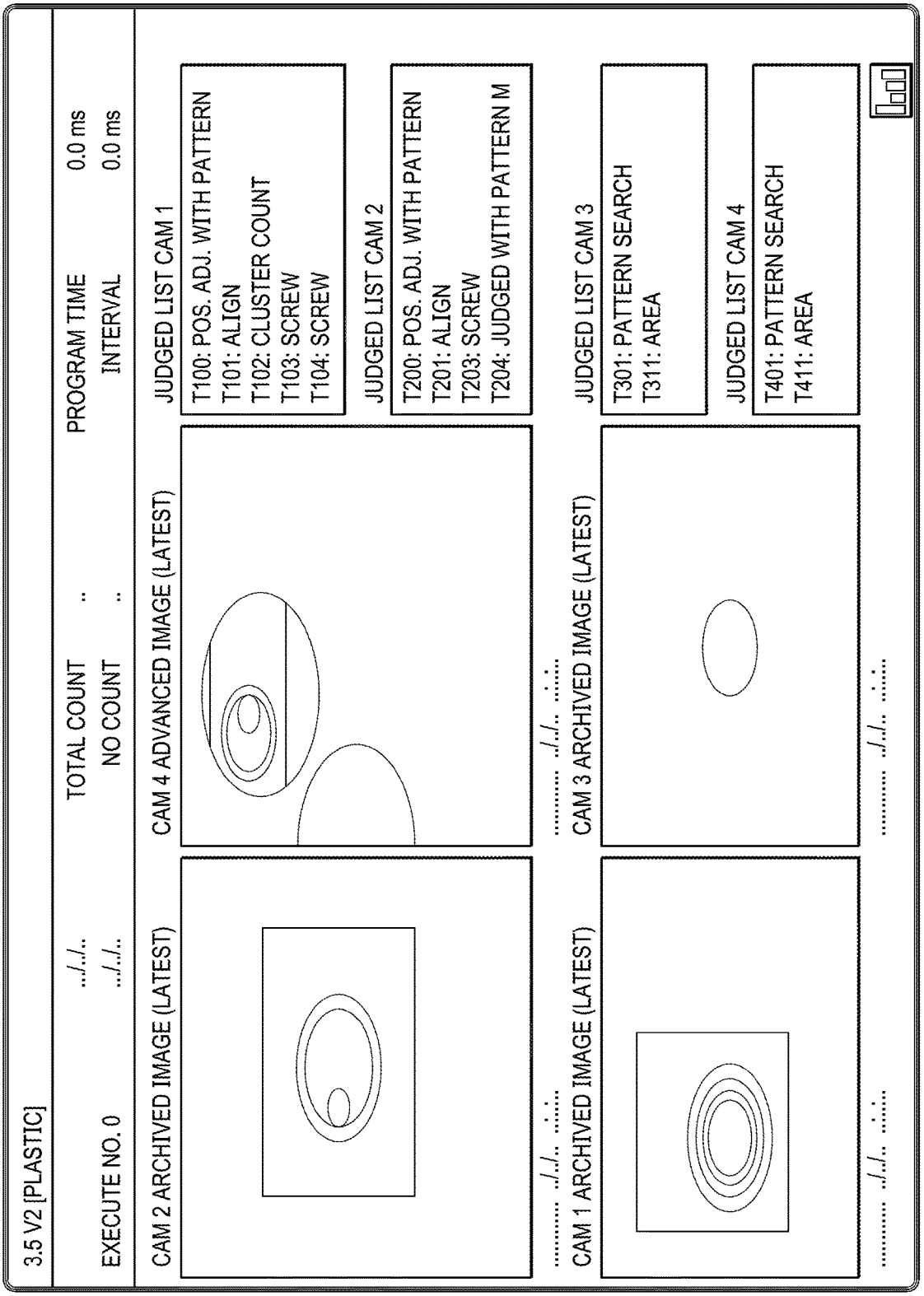
FIG. 8 shows a user interface that displays screw alignment and installation on a hard disk drive (HDD) carrier.

FIG. 8 shows a user interface that displays fastener or screw alignment and installation on a hard disk drive (HDD) carrier. In certain implementations, the user interface can be presented as part of a verification of installation of fastener or screws. In particular, installed fasteners or screws are displayed against target installation locations of where the fasteners or screws as provided by data in memory and applications 118.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as Java, Smalltalk, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for assembling a hard disk drive (HDD) carrier, comprising:
providing instructions from an information handling system to position the HDD carrier in place in order to secure multiple HDD units;
capturing an image of secure holes on the HDD carrier in which fasteners are to be installed;
providing instructions from the information handling system to fetch the fasteners used to secure the HDD units to the HDD carrier;

providing instructions from the information handling system to install the fasteners to the HDD carrier;

capturing an image of installed fasteners on the HDD carrier; and verifying by installation of the installed fasteners by comparing the installed fasteners to data describing location in an application of the information handling system.

2. The method of claim 1, wherein the multiple HDD units are selected from different sizes of HDD units.

3. The method of claim 1, wherein the number of HDD units secured in place include at least ten HDD units.

4. The method of claim 1, wherein different secure holes are provided for different size HDD units.

5. The method of claim 1, wherein fasteners are fetched from different containers based on the type or size of the HDD units.

6. The method of claim 1, wherein a user interface displays captured images of installed fasteners against target location where fasteners are to be installed.

7. The method of claim 1, wherein the verifying includes pass or fail status of installing the fasteners.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
providing instructions from an information handling system to position the HDD carrier in place in order to secure multiple HDD units;
capturing an image of secure holes on the HDD carrier in which fasteners are to be installed;
providing instructions from the information handling system to fetch the fasteners used to secure the HDD units to the HDD carrier;
providing instructions from the information handling system to install the fasteners to the HDD carrier;
capturing an image of installed fasteners on the HDD carrier; and
verifying by installation of the installed fasteners by comparing the installed fasteners to data describing location in an application of the information handling system.

9. The system of claim 8, wherein the multiple HDD units are selected from different sizes of HDD units.

10. The system of claim 8, wherein the number of HDD units secured in place include at least ten HDD units.

11. The system of claim 8, wherein different secure holes are provided for different size HDD units.

12. The system of claim 8, wherein fasteners are fetched from different containers based on the type or size of the HDD units.

13. The system of claim 8, wherein a user interface displays captured images of installed fasteners against target location where fasteners are to be installed.

14. The non-transitory, computer-readable storage medium of claim 13, wherein the verifying includes pass or fail status of installing the fasteners.

15. The system of claim 8, wherein the verifying includes pass or fail status of installing the fasteners.

16. A non-transitory, computer-readable storage medium embodying computer program code, the computer program code comprising computer executable instructions configured for:
providing instructions from an information handling system to position the HDD carrier in place in order to secure multiple HDD units;
capturing an image of secure holes on the HDD carrier in which fasteners are to be installed;
providing instructions from the information handling system to fetch the fasteners used to secure the HDD units to the HDD carrier;
providing instructions from the information handling system to install the fasteners to the HDD carrier;
capturing an image of installed fasteners on the HDD carrier; and
verifying by installation of the installed fasteners by comparing the installed fasteners to data describing location in an application of the information handling system.

17. The non-transitory, computer-readable storage medium of claim 16, wherein the multiple HDD units are selected from different sizes of HDD units.

18. The non-transitory, computer-readable storage medium of claim 16, wherein the number of HDD units secured in place include at least ten HDD units.

19. The non-transitory, computer-readable storage medium of claim 16, wherein different secure holes are provided for different size HDD units.

20. The non-transitory, computer-readable storage medium of claim 16, wherein a user interface displays captured images of installed fasteners against target location where fasteners are to be installed.

* * * * *